May 17, 1966            G. BARG            3,251,223
APPARATUS FOR THE ELECTRONIC MEASUREMENT OF MECHANICAL POWER
Filed June 6, 1963
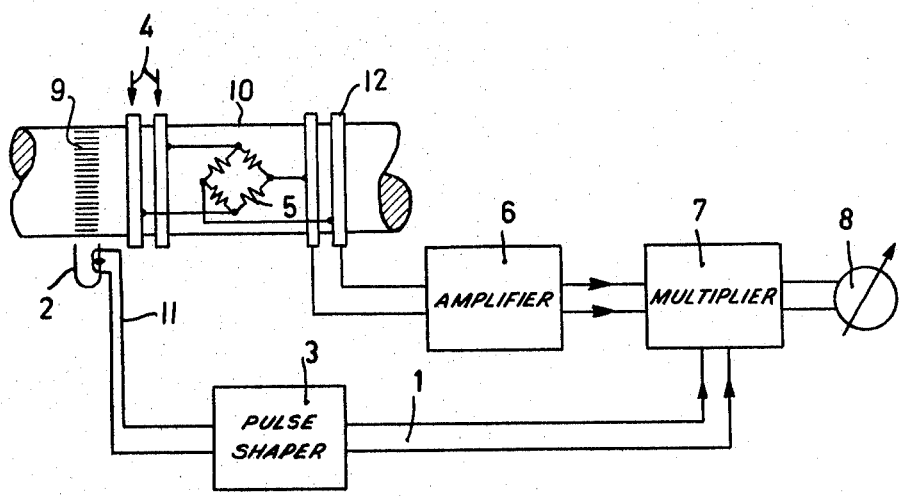
INVENTOR.
GERHARD BARG United States Patent Office 3,251,223
Patented May 17, 1966

3,251,223
APPARATUS FOR THE ELECTRONIC MEASUREMENT OF MECHANICAL POWER
Gerhard Barg, Hamburg, Germany, assignor to North American Philips Company, Inc., New York, N.Y., a corporation of Delaware
Filed June 6, 1963, Ser. No. 286,067
Claims priority, application Germany, July 11, 1962, P 29,793
5 Claims. (Cl. 73—136)

This invention relates to apparatus for measuring shaft horespower and more particularly to a high accuracy pulse type electronic system for measuring the mechanical power of a rotating shaft.

Several methods of electrically or electronically determining the mechanical power transmitted by rotating shafts are known, for example, by means of an instrument which operates in principle like a wattmeter. Two voltages or currents are supplied to this instrument which are proportional to the shaft speed and to the shaft torque, respectively.

The voltage which is proportional to the shaft speed can be taken from a generator coupled to the shaft while a bridge circuit comprising strain gauges delivers a voltage which is proportional to the shaft torque and which, if required, may be amplified in an amplifier.

It is also known to use an automatically self-adjusting compensator and an associated multiplication potentiometer instead of a wattmeter.

It has also been suggested to have the multiplication performed by the strain gauges by feeding the bridge not with a constant voltage, but with a voltage which is dependent upon the shaft speed.

This latter method is limited since it requires a transducer for the shaft rotation which has to deliver a comparatively high voltage, at least if the voltage at the measuring diagonal of the bridge is to have a useful value. However, electrical generators which in themselves are suitable for this purpose generally are not sufficiently accurate. It is also difficult to effect a calibration. Furthermore, the mechanical coupling between the rotating shaft and the generator provides complications.

This disadvantages is avoided in the known purely electronic measurement of the shaft speed in which variations in inductance, which may be obtained from the rotation of the shaft in a variety of manners, are a measure of the shaft speed. However, the shape of the resulting pulses depends upon the shaft speed, so that they cannot readily be used for direct measurements.

In accordance with the invention, an apparatus for the electronic measurement of mechanical power comprises a pulse source as the transducer for the shaft speed and a direct-current fed device using strain gauges as a transducer for the torque. In this novel apparatus the disadvantages of the known method are avoided by converting the direct voltage proportional to the torque, with the aid of pulses of constant height and width derived from the pulse source, into a train of pulses in which the height is proportional to the torque and the frequency to the shaft speed, and by measuring the mean direct current value of these pulses which is proportional to the shaft power to be measured.

In order that the invention may readily be carried into effect, an embodiment thereof will now be described, by way of example, with reference to the accompanying diagrammatic drawing.

In the figure, a shaft 10 to be measured includes a set of indicia 9 about its periphery. A transducer 2 is positioned adjacent the shaft so as to sense the passage of the indicia during rotation of the shaft whereby a pulse train is produced in line 11 which is proportional to the shaft speed. A pulse shaper 3 receives the pulse train and converts same into a pulse train of constant amplitude and duration. This latter pulse train is supplied to a multiplier device 7 via line 1. A direct voltage (not shown) is supplied to one pair of terminals of a strain gauge bridge circuit 5 by means of slip rings 4. The strain gauge supplies a direct voltage proportional to shaft torque to an amplifier 6 by means of slip rings 12. The direct voltage output of amplifier 6 is coupled to another input of multiplier 7. The direct voltage which is taken from the amplifier 6 and is proportional to the torque is applied at a frequency which corresponds to the repetition frequency of the pulses to an indicating or recording instrument 8. Since the indication is proportional to the three quantities pulse-frequency, pulse-width and pulse-height, the desired multiplication is obtained with a constant pulse width, for the pulse-height corresponds directly to the torque, but the width is maintained constant by applying the primary pulse taken from the transducer 2 to the pulse shaper 3, at the output of which uniform pulses of constant height and width, referably rectangular pulses, are available.

Although a preferred embodiment of the invention has been disclosed herein, it is to be understood that I intend to cover all changes and modifications which do not depart from the spirit and scope of the invention as set forth in the appended claims.

What is claimed is:
1. Apparatus for measuring the mechanical power of a rotating shaft comprising pulse generating means responsive to the shaft movement for producig electrical pulses of constant amplitude and duration and having a repetition frequency proportional to the shaft speed, means attached to said shaft for producing a direct voltage which is proportional to the torque of said shaft, means for combining said pulses produced with said direct voltage to provide a train of pulses whose amplitude is proportional to said direct voltage and whose frequency is proportional to shaft speed, and means coupled to said combining means for measuring the mean direct current value of said train of pulses.

2. Apparatus for measuring the shaft horespower of a rotating shaft comprising pulse generating means responsive to the shaft movement for generating electrical pulses in timed relation thereto, said pulses being of constant amplitude and duration and having a repetition frequency proportional to the shaft speed, a strain gauge attached to said shaft and adapted to be supplied with a direct current voltage so as to produce a direct voltage which is proportional to the shaft torque, means coupled to said pulse generating means and to said strain gauge for amplitude modulating said electrical pulses in accordance with the value of said direct voltage, and means responsive to the amplitude modulated pulses for providing an indication of shaft horespower.

3. Apparatus for measuring the shaft horespower of a rotating shaft comprising transducer means positioned close to said shaft and responsive to the shaft rotation for producing electrical pulses having a frequency proportional to the rotational speed of said shaft, pulse shaping means coupled to said transducer for supplying pulses of constant amplitude and duration, a strain gauge bridge circuit secured to said shaft and adapted to be supplied with a direct voltage across one pair of diagonal terminals of the bridge and having a second pair of diagonal terminals for supplying a direct voltage which is proportional to the shaft torque, means for combining said supplied pulses with said supplied proportional direct voltage to produce amplitude modulated pulses having a repetition frequency proportional to shaft speed and an amplitude proportional to shaft torque, and indicating means responsive to said modulated pulses for measuring the mean direct current value of said pulses.

4. A shaft horsepower measuring system comprising multiplying means, a rotating shaft having a set of indicia arranged around its periphery, sensing means positioned adjacent said set of indicia and responsive thereto for producing electrical pulses having a repetition frequency proportional to the shaft speed, pulse shaping means coupled to said sensing means for supplying pulses of constant amplitude and duration to said multiplying means, a resistance strain gauge bridge circuit mounted on said shaft and adapted to be supplied with a direct voltage and comprising means for supplying a direct output voltage to said multiplying means which is proportional to the shaft torque, said multiplying means being responsive to said direct voltage and to said electrical pulses supplied thereto for producing electrical pulses having a repetition frequency proportional to shaft speed and an amplitude proportional to shaft torque, and means coupled to said multiplying means for measuring the mean direct current value of said produced electrical pulses.

5. Apparatus as described in claim 4, wherein said strain gauge bridge circuit comprises a pair of input terminals and a pair of output terminals, said apparatus further comprising a first pair of slip rings mounted on said shaft and adapted to be supplied with a direct voltage, a second pair of slip rings mounted on said shaft and connected to said multiplying means, and means for connecting said bridge circuit input terminals to said first pair of slip rings and said output terminals to said second pair of slip rings.

References Cited by the Examiner

UNITED STATES PATENTS

| | | | |
|---|---|---|---|
| 1,685,964 | 10/1928 | Smith et al. | 73—138 |
| 2,399,635 | 5/1946 | Hope | 73—70.1 |
| 2,949,029 | 8/1960 | Bayles et al. | 73—136 |
| 3,000,569 | 9/1961 | Scorgie | 235—194 |
| 3,049,003 | 8/1962 | Felder | 73—136 |

FOREIGN PATENTS

| | | |
|---|---|---|
| 776,974 | 6/1957 | Great Britain. |
| 861,353 | 2/1961 | Great Britain. |

RICHARD C. QUEISSER, *Primary Examiner.*

C. A. RUEHL, *Asistant Examiner.*